(12) United States Patent
Gaal et al.

(10) Patent No.: US 9,131,524 B2
(45) Date of Patent: Sep. 8, 2015

(54) HALF-DUPLEX/FULL-DUPLEX OPERATION FOR TDD CARRIER AGGREGATION

(71) Applicant: QUALCOMM Incorporated, San Diego, CA (US)

(72) Inventors: Peter Gaal, San Diego, CA (US); Jelena M. Damnjanovic, Del Mar, CA (US); Gene Fong, San Diego, CA (US); Wanshi Chen, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 13/633,677

(22) Filed: Oct. 2, 2012

(65) Prior Publication Data

US 2013/0083704 A1     Apr. 4, 2013

Related U.S. Application Data

(60) Provisional application No. 61/542,765, filed on Oct. 3, 2011.

(51) Int. Cl.
| | |
|---|---|
| *H04W 72/12* | (2009.01) |
| *H04L 5/00* | (2006.01) |
| *H04L 5/14* | (2006.01) |
| *H04W 8/22* | (2009.01) |
| *H04W 76/02* | (2009.01) |
| *H04W 88/06* | (2009.01) |
| *H04B 1/44* | (2006.01) |

(52) U.S. Cl.
CPC ........... *H04W 72/1263* (2013.01); *H04L 5/001* (2013.01); *H04L 5/1469* (2013.01); *H04B 1/44* (2013.01); *H04W 8/22* (2013.01); *H04W 76/025* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,155,032 B2 | 4/2012 | Lindoff et al. | |
| 8,275,424 B2 | 9/2012 | McCoy | |
| 2007/0165754 A1* | 7/2007 | Kiukkonen et al. | 375/346 |
| 2009/0067352 A1* | 3/2009 | Wang | 370/280 |
| 2009/0213765 A1* | 8/2009 | Rinne et al. | 370/278 |
| 2011/0292843 A1 | 12/2011 | Gan et al. | |
| 2012/0020256 A1 | 1/2012 | Tujkovic et al. | |
| 2012/0113831 A1 | 5/2012 | Pelletier et al. | |

(Continued)

FOREIGN PATENT DOCUMENTS

| | | |
|---|---|---|
| EP | 1867060 A1 | 12/2007 |
| JP | 2014519289 A | 8/2014 |

(Continued)

OTHER PUBLICATIONS

CATT: "TDD Inter-band Carrier Aggregation", 3GPP Draft; R1-112106, 3rd Generation Partnership Project (3GPP), Mobile Competence Centre; 650, Route Des Lucioles; F-06921 Sophia-Antipolis Cedex; France, vol. RAN WG1, no. Athens, Greece; 20110822, Aug. 16, 2011, XP050537280, [retrieved on Aug. 16, 2011].

(Continued)

*Primary Examiner* — Ayaz Sheikh
*Assistant Examiner* — Peter Chau
(74) *Attorney, Agent, or Firm* — Patterson & Sheridan, L.L.P.

(57) ABSTRACT

Aspects of the present disclosure relate to methods for communicating using TDD and carrier aggregation.

11 Claims, 11 Drawing Sheets

(56) References Cited

U.S. PATENT DOCUMENTS

| | | | |
|---|---|---|---|
| 2012/0327821 A1* | 12/2012 | Lin et al. | 370/280 |
| 2013/0016676 A1* | 1/2013 | Lohr et al. | 370/329 |
| 2014/0029489 A1* | 1/2014 | Han et al. | 370/280 |
| 2014/0036742 A1* | 2/2014 | Charbit et al. | 370/280 |

FOREIGN PATENT DOCUMENTS

| | | |
|---|---|---|
| JP | 2014521260 A | 8/2014 |
| JP | 2015504637 A | 2/2015 |
| WO | 2012175030 A1 | 12/2012 |
| WO | 2013007152 A1 | 1/2013 |

OTHER PUBLICATIONS

International Search Report and Written Opinion—PCT/IB2012/001983—ISA/EPO—Mar. 8, 2013.

International Search Report and Written Opinion—PCT/US2012/059128—ISA/EPO—Apr. 22, 2013.

LG Electronics: "Overall issues on half-duplex operation based TDD CA with different UL-DL configurations", 3GPP Draft; R1-120421 HD Based Different TDD CA (Final), 3rd Generation Partnership Project (3GPP), Mobile Competence Centre; 650, Route Des Lucioles; F-06921 Sophia-Antipolis Cedex; France, vol. RAN WG1, no. Dresden. Germany; 20120206-20120210. Jan. 31, 2012. XP050562910, [retrieved on Jan. 31, 2012].

New Postcom: "Inter-band CA with different UL-DL configuration in TDD", 3GPP Draft; R1-112656 Inter-Band CA With Different UL-DL Configuration in TDD, 3rd Generation Partnership Project (3GPP), Mobile Competence Centre; 650, Route Des Lucioles; F-06921 Sophia-Antipolis Cedex; France, vol. RAN WG1, no. Athens. Greece; 20110822, Aug. 16, 2011, XP050537711, [retrieved on Aug. 16, 2011].

Renesas Mobile Europe Ltd, "Operation Principles of CC specific TDD Configuration", 3GPP Draft; R1-112306, 3rd Generation Partnership Project (3GPP), Mobile Competence Centre; 650, Route Des Lucioles; F-06921 Sophia-Antipolis Cedex; France, vol. RAN WG1, no. Athens, Greece; 20110822, Aug. 16, 2011, XP050537448, [retrieved on Aug. 16, 2011].

MCC Support, "Draft Report of 3GPP TSG RAN WG1 #66 v0.2.0", 3GPP Draft; 3rd Generation Partnership Project (3GPP), Mobile Competence Centre; 650, Route Des Lucioles; F-06921 Sophia-Antipolis Cedex; France, vol. RAN WG1, no. Zhuhai; 20111010, Sep. 13, 2011, XP050538051, [retrieved on Sep. 13, 2011].

Nokia Siemens Networks et al., "Views on inter-band CA with different TDD configurations on different bands", 3GPP Draft; R1-113136, 3rd Generation Partnership Project (3GPP), Mobile Competence Centre; 650, Route Des Lucioles; F-06921 Sophia-Antipolis Cedex; France, vol. RAN WG1, no. Zhuhai; 20111010, Oct. 4, 2011, XP050538271, [retrieved on Oct. 4, 2011].

Partial International Search Report—PCT/IB2012/001983—ISA/EPO—Jan. 16, 2013.

Partial International Search Report—PCT/US2012/059128—ISA/EPO—Jan. 16, 2013.

Sharp, "Specification impact of inter-band carrier aggregation with different TDD configurations", 3GPP Draft; R1-113820, 3rd Generation Partnership Project (3GPP), Mobile Competence Centre; 650, Route Des Lucioles; F-06921 Sophia-Antipolis Cedex; France, vol. RAN WG1, No. San Francisco, USA; 20111114-20111118, Nov. 8, 2011, XP050561912, [retrieved on Nov. 8, 2011].

ZTE, "HARQ timing of PDSCH on cross-carrier scheduled SCell for TDD CA with different UL-DL configurations", 3GPP Draft; R1-122110, 3rd Generation Partnership Project (3GPP), Mobile Competence Centre; 650, Route Des Lucioles; F-06921 Sophia-Antipolis Cedex, vol. RAN WG1, no. Prague, Czech Republic; 20120521-20120525, May 12, 2012, XP050600389, [retrieved on May 12, 2012].

CMCC: "Discussion on support of different TDD UL-DL configurations on different bands", 3GPP Draft; R1-113452 Discussion on Support of Different TDD UL-DL Configurations on Different Bands, 3rd Generation Partnership Project (3GPP), MOB1 Le Competence Centre; 658, Route Des Lucioles; F-86921 Sophi A-Anti Polis Cedex; France, vol. RAN WG1, No. Zhuhai; Oct. 10, 2011, Oct. 5, 2011 (2011-18-85), XP050538540, section 1 section 2.1 section 3.4.1, 'Scenario 1'.

Ericsson: "On support of different TDD UL-DL configurations on different bands", 3GPP TSG-RAN WG1 #67, 3GPP, Nov. 18, 2011, R1-114414, 6 Pages.

* cited by examiner

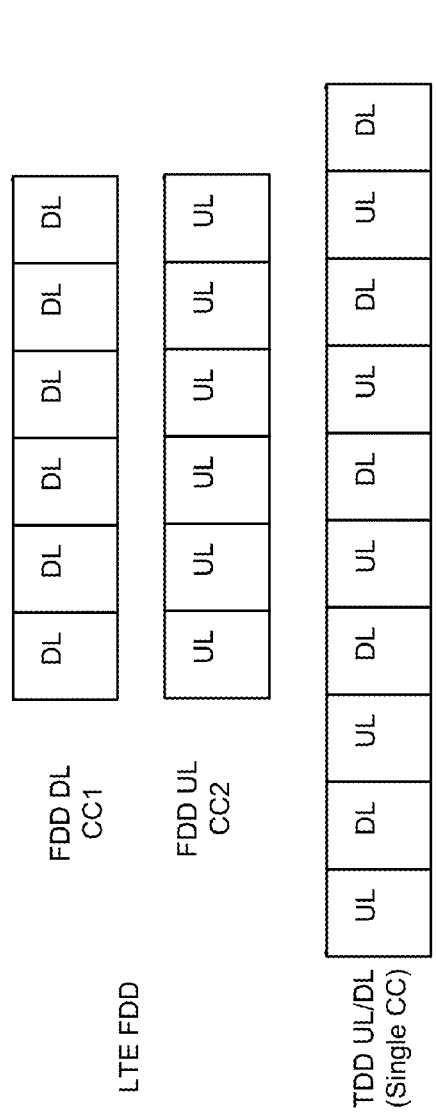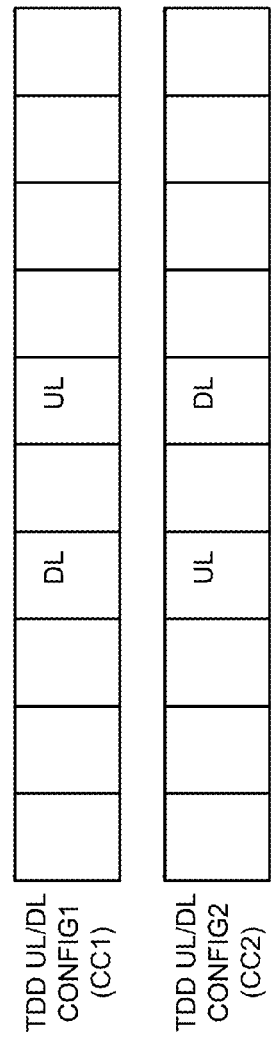

HALF-DUPLEX/FULL-DUPLEX OPERATION FOR TDD CARRIER AGGREGATION

CLAIM OF PRIORITY UNDER 35 U.S.C. §119

The present Application for Patent claims priority to U. S. Provisional Application No. 61/542,765, entitled, "HALF-DUPLEX/FULL-DUPLEX OPERATION FOR TDD CARRIER AGGREGATION," filed Oct. 3, 2011, and assigned to the assignee hereof and hereby expressly incorporated by reference herein

FIELD

Aspects of the present disclosure relate generally to wireless communication systems, and more particularly, to such systems that utilize carrier aggregation and time division duplex (TDD) techniques.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for wireless communication using carrier aggregation are described herein.

In an aspect, a method for wireless communication by a base station is provided. The method generally includes determining whether or not a user equipment (UE) is to communicate in half-duplex (HD) or full-duplex (FD) and scheduling resources on different component carriers (CCs) or communications with the UE based, at least in part, on the determination.

In another aspect, a method for wireless communication by a user equipment is provided. The method generally includes determining that, for at least one subframe, an uplink subframe and downlink subframe on different component carriers (CCs) used to communicate with the UE by a base station overlap and following at least one prioritization rule to determine whether to transmit or receive during the at least one subframe.

According to an aspect, an apparatus for communicating by a base station is provided. The apparatus generally includes means for determining whether or not a user equipment (UE) is to communicate in half-duplex (HD) or full-duplex (FD) and means for scheduling resources on different component carriers (CCs) or communications with the UE based, at least in part, on the determination.

According to an aspect, an apparatus for half-duplex (HD) operations by a user equipment (UE) is provided. The apparatus generally includes means for determining that, for at least one subframe, an uplink subframe and downlink subframe on different component carriers (CCs) used to communicate with the UE by a base station overlap and means for following at least one prioritization rule to determine whether to transmit or receive during the at least one subframe.

According to an aspect, an apparatus for communicating by a base station is provided. The apparatus generally includes at least one processor configured to determine whether or not a user equipment (UE) is to communicate in half-duplex (HD) or full-duplex (FD) and schedule resources on different component carriers (CCs) or communications with the UE based, at least in part, on the determination and a memory coupled with the at least one processor.

According to an aspect, an apparatus for half-duplex (HD) operations by a user equipment (UE) is provided. The apparatus generally includes at least one processor configured to determine that, for at least one subframe, an uplink subframe and downlink subframe on different component carriers (CCs) used to communicate with the UE by a base station overlap and follow at least one prioritization rule to determine whether to transmit or receive during the at least one subframe; and a memory coupled with the at least one processor.

According to an aspect, a computer program product for communicating by a base station comprising a computer readable medium having code stored thereon is provided. The code is generally executable by one or more processors for determining whether or not a user equipment (UE) is to communicate in half-duplex (HD) or full-duplex (FD) and scheduling resources on different component carriers (CCs) or communications with the UE based, at least in part, on the determination.

According to an aspect, a computer program product for half-duplex (HD) operations by a user equipment (UE) comprising a computer readable medium having code stored thereon. The code is generally executable by one or more processors for determining that, for at least one subframe, an uplink subframe and downlink subframe on different component carriers (CCs) used to communicate with the UE by a base station overlap and following at least one prioritization rule to determine whether to transmit or receive during the at least one subframe Various aspects and features of the disclosure are described in further detail below.

BRIEF DESCRIPTION OF THE DRAWINGS

FIG. 8 shows an example TDD mode subframe configuration

FIG. 8A shows an example TDD mode subframe configuration for a multi-carrier system;

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
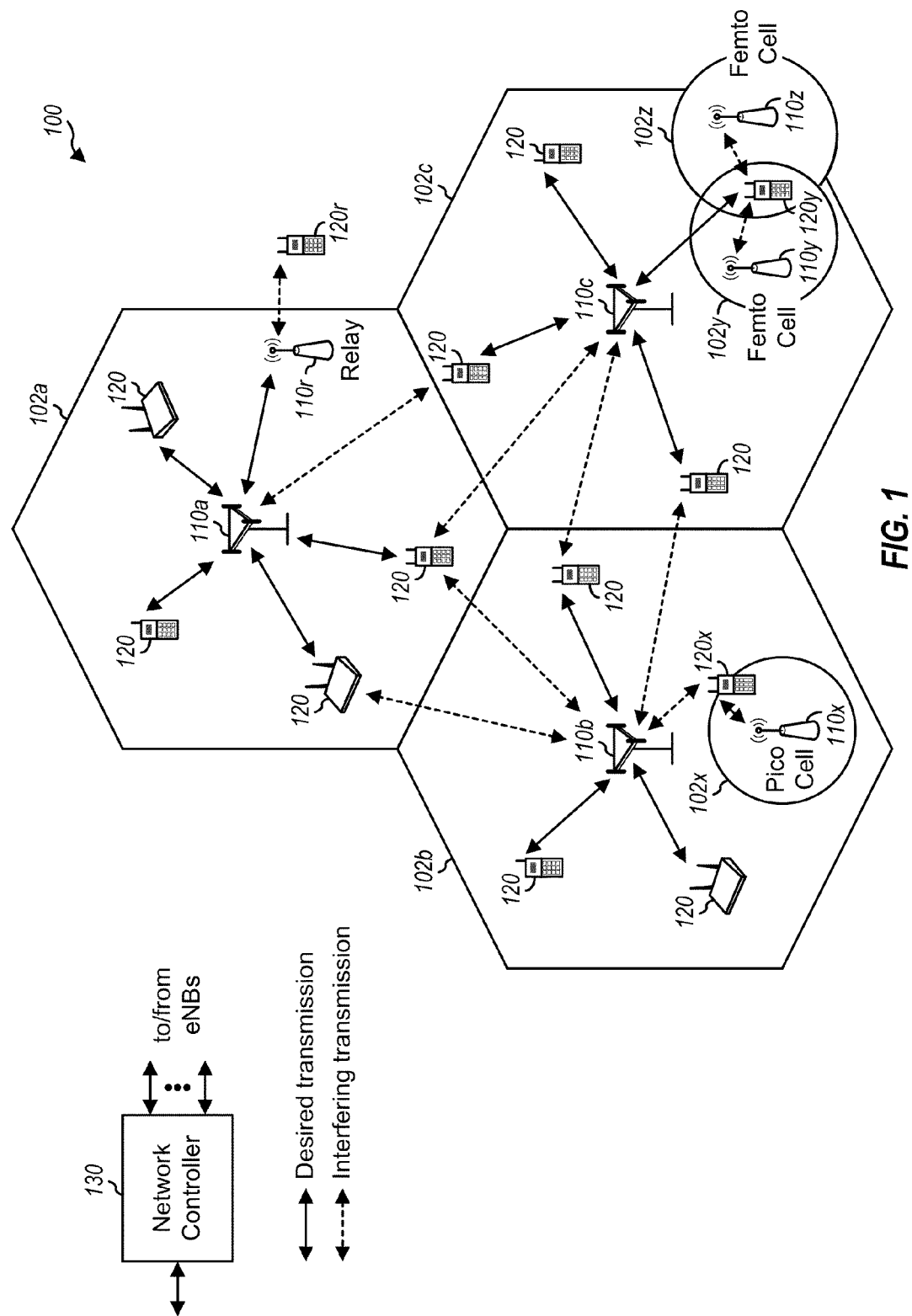
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
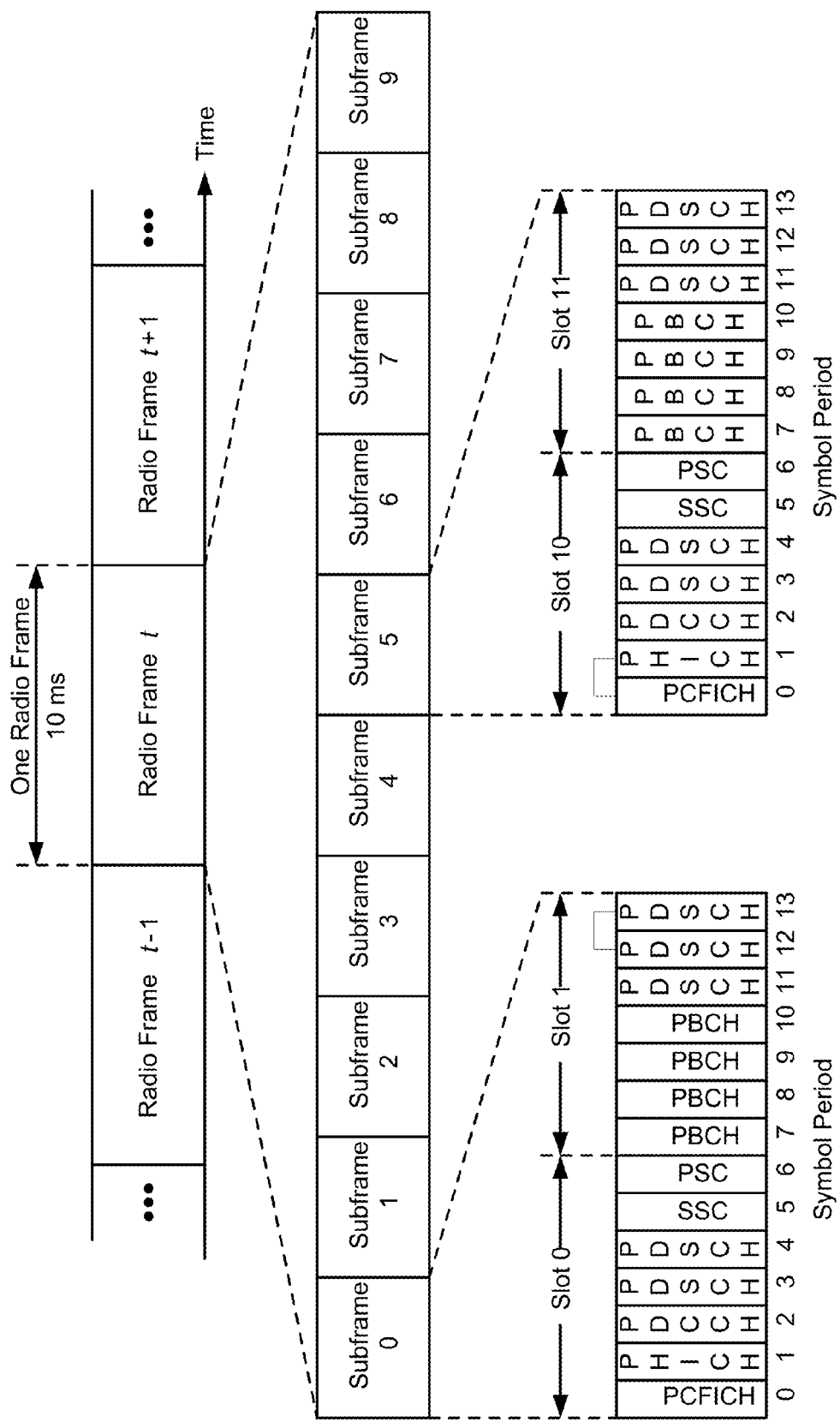
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
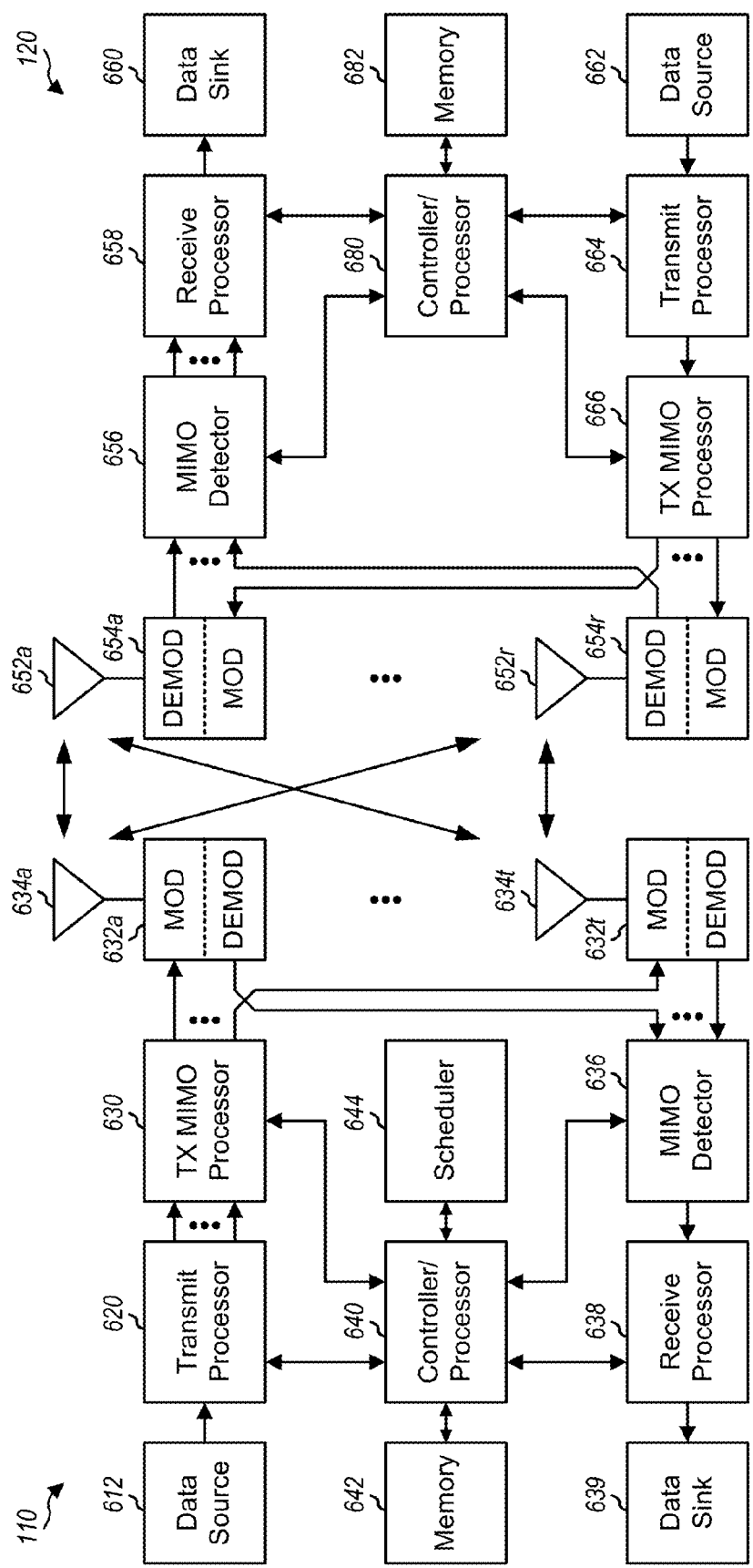
FIG. 3 is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 634a through 634t, and the UE 120 may be equipped with antennas 652a through 652r.

At the base station 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the base station 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the base station 110. At the base station 110, the uplink signals from the UE 120 may be received by the antennas 634, processed by the modulators 632, detected by a MIMO detector 636 if applicable, and further processed by a receive processor 638 to obtain decoded data and control information sent by the UE 120. The receive processor 638 may provide the decoded data to a data sink 639 and the decoded control information to the controller/processor 640.

The controllers/processors 640 and 680 may direct the operation at the base station 110 and the UE 120, respectively. The processor 640 and/or other processors and modules at the base station 110 may perform or direct the execution of various processes for the techniques described herein. The processor 680 and/or other processors and modules at the UE 120 may also perform or direct the execution of the functional blocks illustrated in FIGS. 4A, 4B, 5 and 6, and/or other processes for the techniques described herein. The memories 642 and 682 may store data and program codes for the base station 110 and the UE 120, respectively. A scheduler 644 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 680, the memory 682, the receive processor 658, the MIMO detector 656, the demodulators 654a, and the antennas 652a configured to perform the functions recited by the aforementioned means. In another aspect, the aforementioned means may be a module or any apparatus configured to perform the functions recited by the aforementioned means.

Carrier Aggregation

LTE-Advanced UEs use spectrum up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
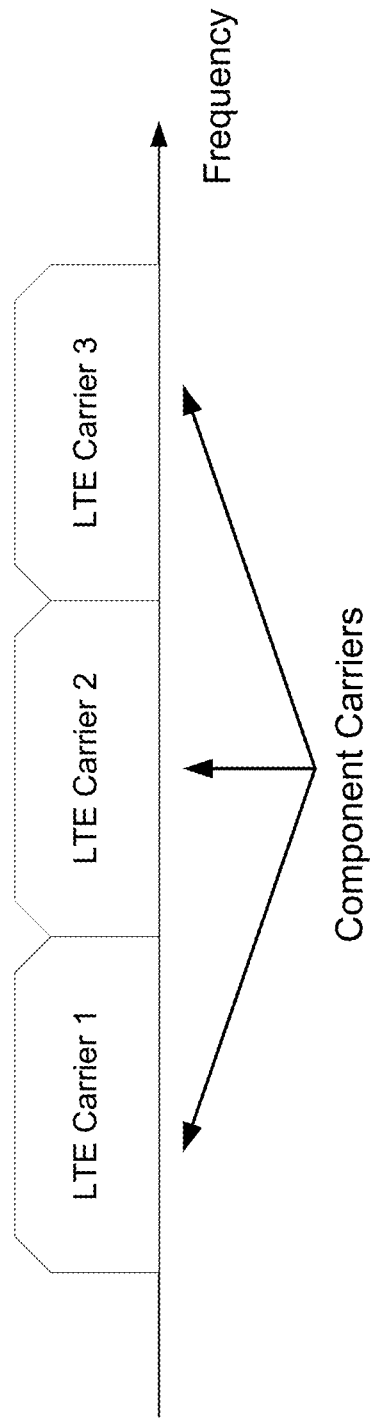
FIG. 4A discloses a continuous carrier aggregation type.
Figure 4B:
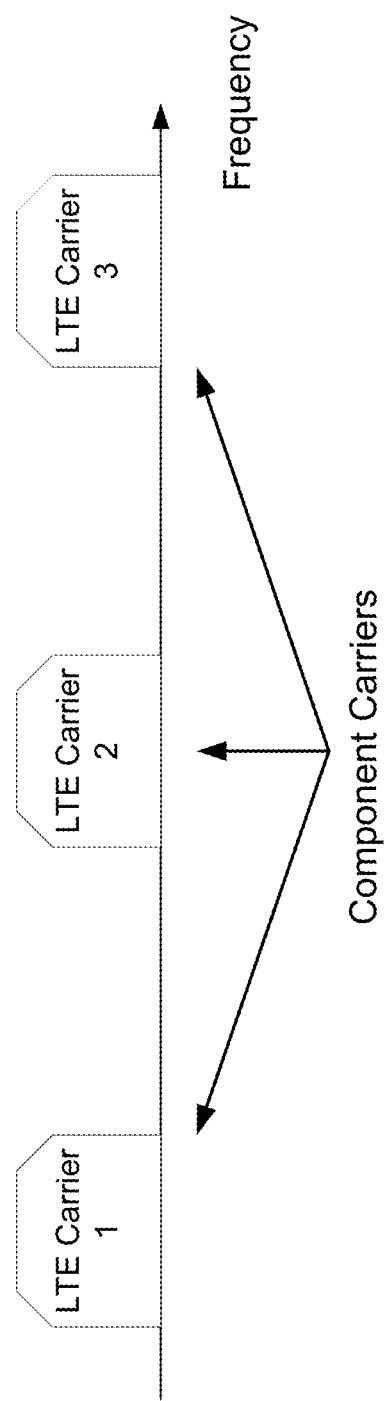
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
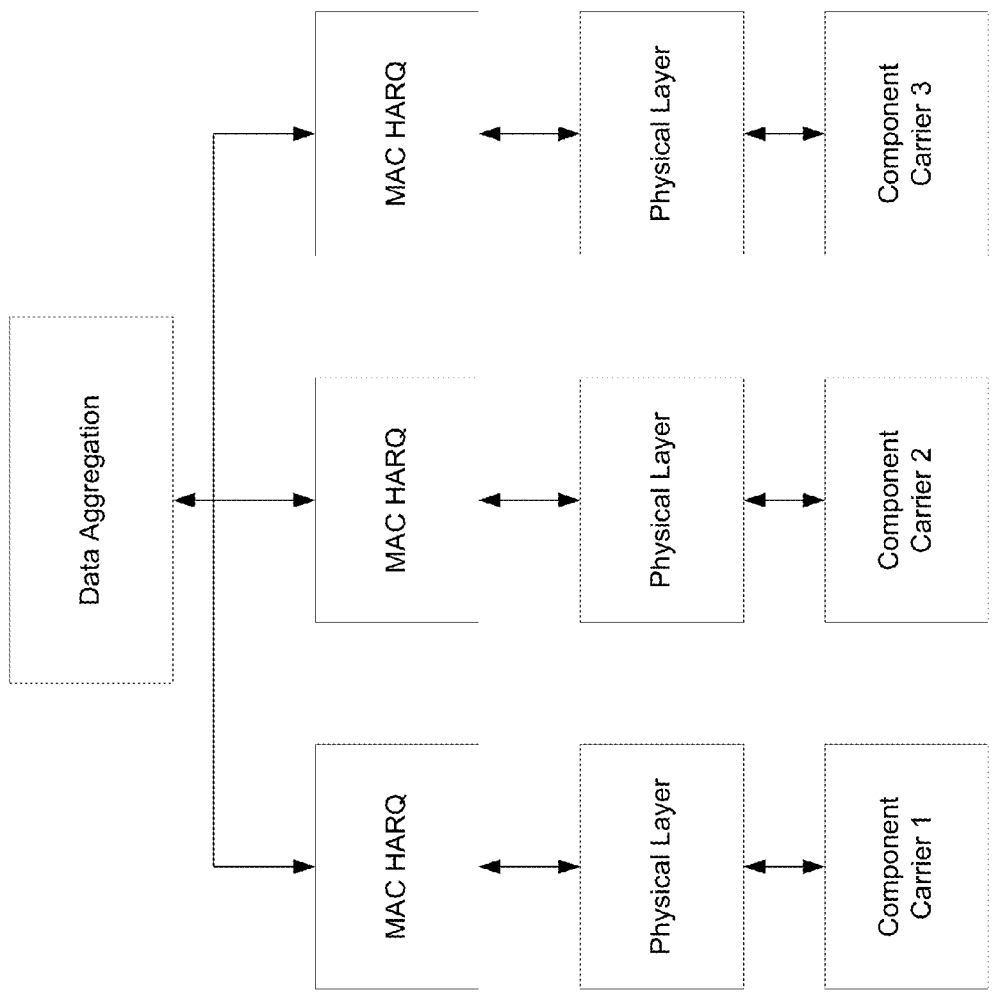
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 6:
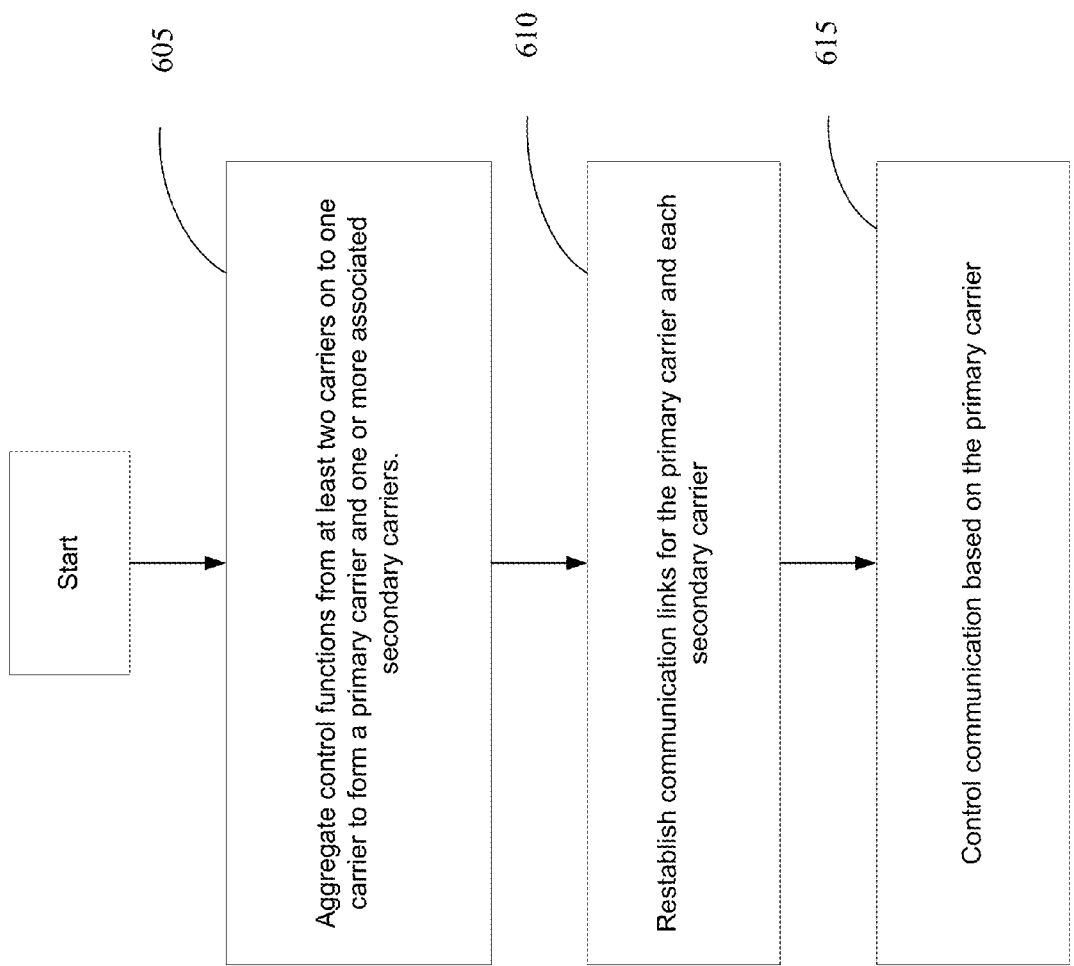
FIG. 6 is a block diagram illustrating a method for controlling radio links in multiple carrier configurations

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

TDD Carrier Aggregation

Certain conventional wireless communication standards, such as the current version of Long Term Evolution (LTE) Release 10 (Rd-10) allow for aggregation of time domain duplexing (TDD) only or frequency domain duplexing (FDD) only component carriers (CCs). However, as the demand on wireless bandwidth increases, additional techniques may be needed. Aggregating CCs in the time and/or frequency domains (e.g., frequency domain duplexing, FDD, or time domain duplexing, TDD, aggregation) may be a technique used to address the increased demand on bandwidth, among others.

In some designs, a TDD carrier may be aggregated with only the uplink (UL) portion (e.g., only subframes designated as UL) or downlink (DL) portion (e.g., only subframes designated for DL) of another TDD carrier (called unidirectional aggregation).

Figure 7:
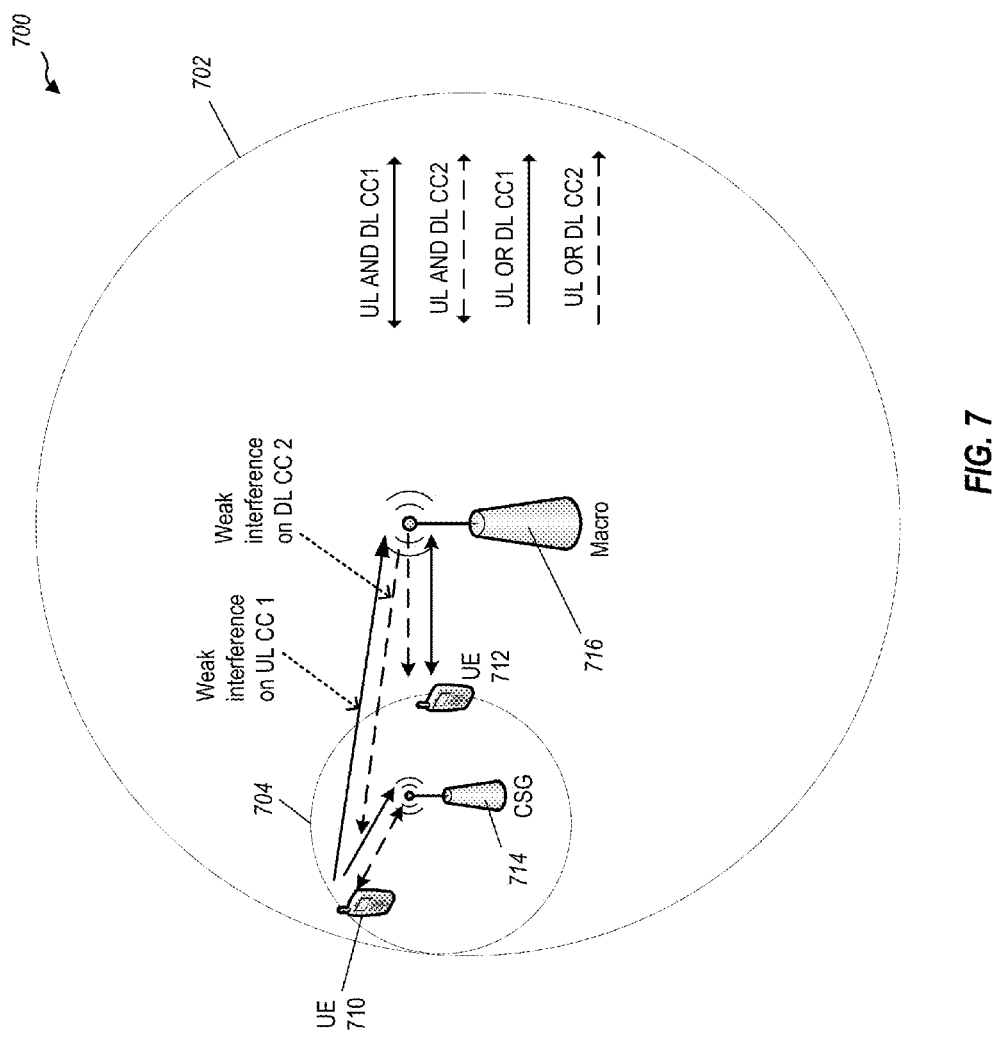
FIG. 7 shows an exemplary wireless network configuration comprising a macro cell and a closed subscriber group.

With reference to FIG. 7, an illustrative example of implementing TDD-TDD aggregation in a wireless network 700 comprising a macro cell 702 and a closed subscriber group, CSG, 704 is described. In the depicted example of FIG. 7, two component carriers are assumed, CC1 and CC2, which may be TDD carriers, for example, with CC1 being an anchor component carrier for the macro cell 702 and CC2 being the anchor component carrier for the CSG 704.

As illustrated, UE 710 may be a part of the CSG 704. Some UEs, such as UE 712 may be within coverage of the CSG 704, but may not be able to connect to the eNB 714 of the CSG 704, e.g., because of restricted access in the CSG 704. The lines with single headed arrows connecting eNBs 714, 716 with the corresponding UEs 710 and 712 in FIG. 7 may represent possible unidirectional carrier aggregation (UL or DL only) while the lines with double headed arrows may be possible bidirectional UL and DL carrier aggregation.

In FIG. 7, transmissions on CC1 are indicated with solid arrows, while transmissions on CC2 are indicated with dashed arrows. As indicated, each component carrier can be a unidirectional CC (as indicated with single headed arrows) or a bidirectional CC (as indicated with double headed arrows), where bidirectional component carriers comprise UL and DL carriers while unidirectional component carriers comprise either an UL or a DL carrier.

A LTE TDD CC is a single carrier which uses the same frequency bands for the uplink and the downlink. The transmission directions are separated by carrying UL and DL data in different subframes. The uplink and downlink subframe allocation is periodic and is defined by the periodicity of the downlink-to-uplink switch point. The periodicity may be 10 msec or 5 msec. See FIG. 8. On the other hand, a LTE FDD CC uses paired frequency carriers (one UL and the other DL) to separate the UL and DL in frequency.

In some designs, aggregation performed in the macro cell 702 may protect (e.g., not aggregate) the anchor CC2 for the CSG 704. In some designs, therefore, CC1 may be aggregated both in the UL and DL, while CC2 may be aggregated only in the DL subframes. Furthermore, if aggregation is performed in the CSG 704, then the aggregated carrier should be such that the DL carrier used by the macro cell 702 is protected. Therefore, in some designs, carrier CC2 may be aggregated both in the UL and/or DL direction, but CC1 may be aggregated only in the UL subframes, not the DL subframes.

Half-duplex/Full-duplex Operation for TDD Carrier Aggregation

Carrier aggregation of TDD carriers with different UL-DL subframe configurations may be considered. One of the issues to be addressed relates to full-duplex versus half duplex operation that is relevant to this type of carrier aggregation. With different subframe configurations, downlink and uplink subframes may overlap, meaning downlink and uplink transmissions on different component carriers occurring in the same subframe. This is illustrated in FIG. 8A, which shows an example of two different configurations used for two different CCs.

In general, conventional systems have utilized only half duplex operation for TDD. However, aspects of the present disclosure allow for full duplex operation when a UE has carriers of different UL-DL configurations configured, allowing the UE in certain instances to transmit and receive at the same time.

If half-duplex operation is not imposed by architectural reasons (which may not be the case as "per carrier" radios should be available due to the adopted assumption that carriers are in different bands), meaning the UE may be capable of both HD and FD operation, certain aspects presented herein may address this issue by having an eNB make a decision regarding how to treat a UE, as a HD and employ the scheduling restrictions or as a FD and simultaneously transmit and receive on different CCs. As will be described below, various criteria may be considered when deciding how a UE should be regarded (as FD or HD).

Utilizing TDD carrier aggregation (CA) with different UL-DL subframe configurations generally implies that on some subframes on different component carriers (CCs) UL and DL subframe will overlap as shown in FIG. 8A.

For UEs operating in full-duplex (FD) mode, this may not be an issue, as the UE may be able to simultaneously transmit and receive on different CCs with no issues. However, this may present a challenge if the UE only supports half-duplex (HD) communications-or is limited to HD for various reasons such as de-sensing (to reduce interference caused by transmitting while receiving. In this case, on the overlapping UL-DL subframes, the UE may be able only to transmit or receive.

On each UL-DL subframe overlap, a UE may be configured to transmit according to one or more prioritization rules. For example, a UE may be configured to transmit on UL, if there is anything to transit (PUCCH/PUSCH), such as data, CQI, or ACK/NACK feedback. In this case, DL reception may be limited or halted altogether. In some cases, DL subframes on all CCs are blocked when UL transmission is due.

In some cases, even in a UL subframe, a UE may be capable of DL reception on a CC, for example, if the UE has a separate RF chain from the one used for transmission on UL on another CC. However, in such cases, the received signal may be bad (e.g., due to interference caused by the transmission), and hence discarded. Therefore, a prioritization rule may dictate that a UE should continue downlink reception on at least one component carrier (CC) during the at least one subframe and discard the corresponding downlink transmission if signal quality is not sufficient.

Therefore, in some cases, in overlapping subframes, a UE may be configured to receive on DL only if no UL transmission is due.

Because of the potential limitation, an eNB (or any type of base station generally) may utilize some type of intelligent scheduling algorithm to avoid missed DLs for UE HD operation. This may impose scheduling restrictions. For example, in the case that a primary component carrier (PCC) is used heavily for UL transmissions, there may be more scheduling restrictions due to PUCCH transmissions. On the other hand, if the PCC is used heavily for DL, it may be easier to apply/plan the scheduling restrictions as they are the function of PUSCH scheduled transmissions only.

HD operation by a UE may result from architectural or operational limitations. For architectural limitations, HD operation may be imposed due to UE architectural inability to receive and transmit at the same time. Operationally, there may be RF restrictions, where HD operation is imposed due to de-sense problems (transmission interference to the received signal).

When there is no architectural restriction, however, an eNB may assume FD operation for some UEs and HD operation for some other group of UEs. FD UEs can transmit and receive at the same subframe and, hence, there may be little or no scheduling restrictions. HD UEs, on the other hand, can receive only when they do not transmit. Scheduling restrictions (as mentioned earlier) may be implemented by the eNB to avoid wasted resources.

There are various signaling options to convey information about FD or HD operation by a UE. In some cases, a UE may signal the eNB regarding its FD/HD capability. In such cases, the eNB may determine the UE is FD capable and schedule resources accordingly. In some cases, the eNB may transmit signaling (back to) indicating to the UE that the eNB regards the UE as an FD or HD UE. In some cases, the determination may change (e.g., based on changing conditions or based on an updated capability message from the UE).

There are various criteria an eNB may utilize to determine whether to treat a UE as FD or HD capable (e.g., the determination may be made based on one or more parameters). One or more of these criteria may relate to the relative transmission and/or receive power of the UE (e.g., indicative of likely interference caused by transmitting while receiving). These criteria may include UE location (a UE closer to a base station is likely to have lower transmission power and higher receiver power), UE transmission power, UE receive power, or a ratio of transmission and receive power.

Various other criteria may also be considered, such as target demodulation SNR, UE antenna configuration, Rx diversity capability and Tx-Rx antenna coupling, general UE capability, allocated resources on UL and/or DL. Frequency separation between the allocated resources (e.g., bands, channels and resources) where CCs with overlapping UL-DL subframes are located may also be considered. For example, substantial frequency separation between CCs used for transmission and reception may reduce the amount of interference.

UE capability with respect to ability to support HD or FD, as signaled by the UE itself, may also be considered. In some cases, a UE capable of both HD and FD operation may make a decision on which to use based on its architectural abilities and/or all the aspects listed above, and signal this decision to the eNB.

From the UE perspective, when operating in HD mode, the UE may simply follow prioritization rules to decide how to act in overlapping subframes (with UL and DL subframes occurring on different component carriers. As noted above, the prioritization rules may be as simple as receive DL transmissions only if there is nothing to transmit on the UL.

A UE may still have to dynamically switch between the UL-DL transmissions on the UL-DL overlapping subframes and adhere, for example, to a 4 ms advance if strict HD in the case that the same RF chain is used. Some scheduling delay (packet delay) may be observed due to the scheduling restrictions imposed by the eNB.

From the eNB perspective, an intelligent scheduling algorithm may be utilized to help efficiently schedule resources based on the determined UE capability. This algorithm may be relatively complex and may depend on the aggregated UL-DL configurations. If multiuser diversity cannot be fully utilized, system throughput performance loss may be expected in addition to the user delay experience.

If an eNB makes a mistake about a UE's ability for HD/FD operation (e.g., wrongly estimating the UE's ability to receive good DL while transmitting) and actually sends something for it on DL while the UE could not receive it due to de-sensing-or lack of FD capability, there will be some performance loss.

However, the network should be able to eventually detect this based on a lack of expected UL transmissions. Thus, the network may be able to correct its decision on the operation mode of the UE. Further, the eNB may be able to correct its operation based on explicit signaling from the UE.

In some cases, an eNB may place restrictions on carrier aggregation that utilizes different subframe configurations for different CCs. For example, an eNB may limit this type of aggregation to FD capable UEs, rather than imposing scheduling restrictions for HD operation.

In some cases, limited carrier aggregation may be allowed for UEs that lack ability to support FD, such as aggregating no more than 2 UL-DL configurations or not aggregating very different subframe configurations (e.g., with a limit on the maximum number of overlapping subframes).

Figure 9:
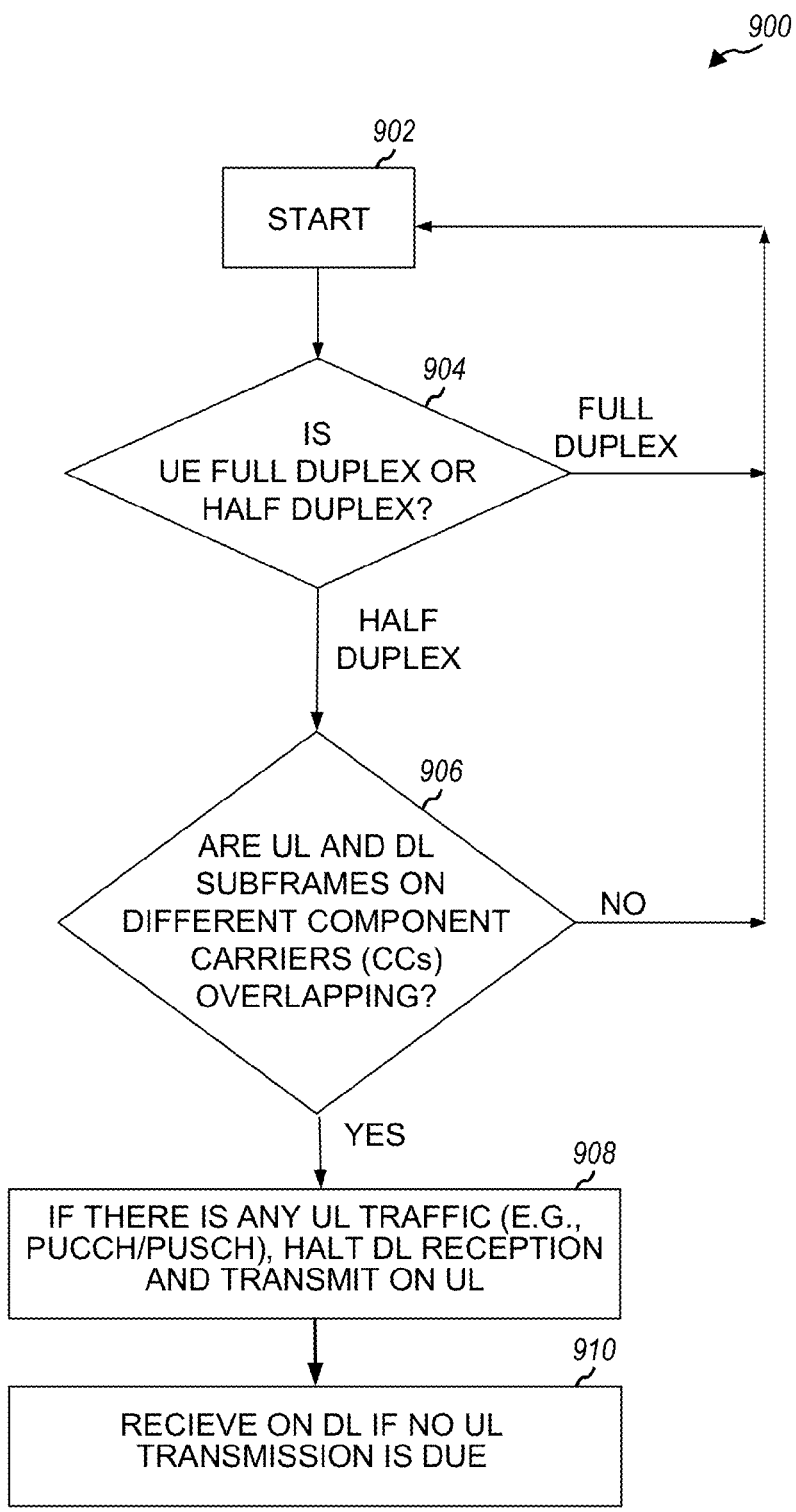
FIG. 9 is a flow chart representation of an example process of wireless communication.

FIG. 9 is a flow chart showing example operations 900 for implementing prioritization rules in the event of overlapping subframes. The operations 900, which begin at 902, may be performed, for example, by a UE that is capable of communicating in half duplex or full duplex. If there are no limitations for the UE to operate in FD mode (as determined at 904), the UE may not need to perform the other operations.

If the UE is half duplex, however, and UL and DL subframes on different component carriers overlap, as determined at 906, the UE may need to decide whether to transmit or receive. If there is UE traffic (e.g., PUCCH or PUSCH), the UE may halt DL reception and transmit on the UL, at 908. On the other hand, if there is no UL traffic, the UE receives on the DL, at 910.

Figure 10:
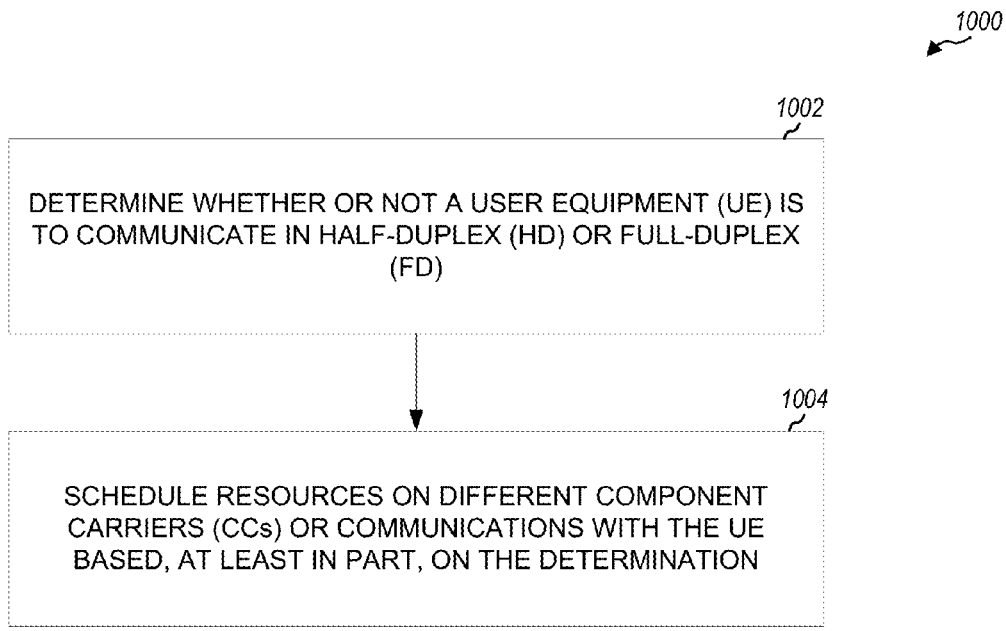
FIG. 10 is a flow chart representation of example operations for wireless communication that may be performed at a base station.

FIG. 10 is a flow chart showing example operations 1000 for wireless communication that may be performed at a base station. As illustrated, the base station may determine, at 1002, whether or not a user equipment (UE) is to communicate in half-duplex (HD) or full-duplex (FD). At 1004, the base station may schedule resources on different component carriers (CCs) or communications with the UE based, at least in part, on the determination.

Figure 11:
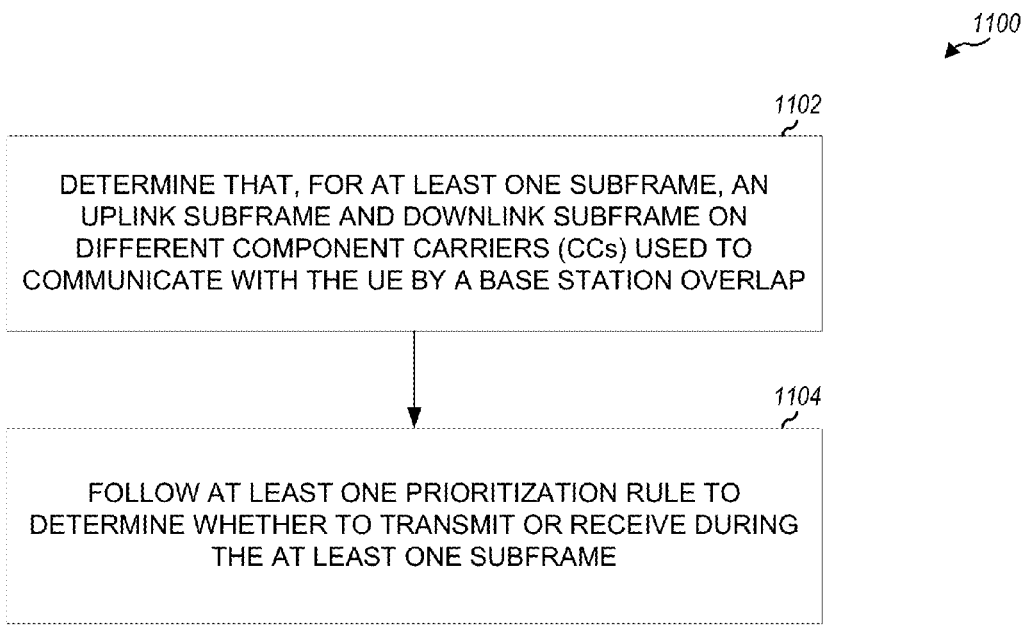
FIG. 11 is a flow chart representation of example operations for wireless communication that may be performed at a user equipment (UE).

FIG. 11 is a flow chart representation of example operations 1100 for wireless communication that may be performed at a user equipment (UE). As illustrated, at 1102, the UE may determine that, for at least one subframe, an uplink subframe and downlink subframe on different component carriers (CCs) used to communicate with the UE by a base station overlap. At 1104, the UE may follow at least one prioritization rule to determine whether to transmit or receive during the at least one subframe.

As described above, the techniques presented herein may allow a UE to operate in full duplex mode, when possible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure.

Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for half-duplex (HD) operations by a user equipment (UE), comprising:
   determining, by the UE, an overlap in at least one uplink-downlink subframe in which an uplink subframe and a downlink subframe on different component carriers (CCs) used to communicate with the UE by a base station overlap; and
   following at least one prioritization rule of uplink-downlink subframe overlap, by the UE, to determine whether to transmit or receive during the at least one uplink-downlink subframe, wherein the at least one prioritization rule dictates that the UE:
     transmits during the at least one uplink-downlink subframe when the UE has at least one of uplink data or uplink control data to transmit in the at least one uplink-downlink subframe;
     is configured to receive a signal in a downlink transmission on at least one CC during the at least one uplink-downlink subframe when the UE has no uplink data or uplink control data to transmit during the at least one uplink-downlink subframe; and
   discards the signal received in the downlink transmission based on signal quality of the received signal.

2. The method of claim 1, further comprising:
   signaling, by the UE, the base station regarding capability of the UE to perform communications in HD or full duplex (FD).

3. The method of claim 1, further comprising:
   receiving, by the UE, signaling from the base station indicating the base station regards the UE as communicating in HD.

4. The method of claim 1, further comprising determining, by the UE, whether to operate in full duplex (FD) mode or HD mode.

5. The method of claim 4, wherein the determination whether to operate in FD mode or HD mode is made based on one or more parameters.

6. The method of claim 5, wherein the one or more parameters comprise at least one of: UE location, UE transmission power, UE receive power, or a ratio of UE transmission and receive power.

7. The method of claim 4, wherein the determination whether to operate in FD mode or HD mode is made based on signaling from the UE regarding capability of the UE to perform communications in HD or FD.

8. The method of claim 4, wherein the determination whether to operate in FD mode or HD mode is made based on resources allocated for uplink and downlink transmissions.

9. An apparatus for half-duplex (HD) operations by a user equipment (UE), comprising:
   means for determining an overlap in at least one uplink-downlink subframe in which an uplink subframe and a downlink subframe on different component carriers (CCs) used to communicate with the UE by a base station overlap; and
   means for following at least one prioritization rule of uplink-downlink subframe overlap to determine whether to transmit or receive during the at least one uplink-downlink subframe, wherein the at least one prioritization rule dictates that the UE:
     transmits during the at least one uplink-downlink subframe when the UE has at least one of uplink data or uplink control data to transmit in the at least one uplink-downlink subframe;
     is configured to receive a signal in a downlink transmission on at least one CC during the at least one uplink-downlink subframe when the UE has no uplink data or uplink control data to transmit during the at least one uplink-downlink subframe; and
   discards the signal received in the downlink transmission based on signal quality of the received signal.

10. An apparatus for half-duplex (HD) operations by a user equipment (UE), comprising:
    at least one processor of the UE configured to:
      determine an overlap in at least one uplink-downlink subframe in which an uplink subframe and a downlink subframe on different component carriers (CCs) used to communicate with the UE by a base station overlap; and
      follow at least one prioritization rule of uplink-downlink subframe overlap to determine whether to transmit or receive during the at least one uplink-downlink subframe, wherein the at least one prioritization rule dictates that the UE:
        transmits during the at least one uplink-downlink subframe when the UE has at least one of uplink data or uplink control data to transmit in the at least one uplink-downlink subframe;
        is configured to receive a signal in a downlink transmission on at least one CC during the at least one uplink-downlink subframe when the UE has no uplink data or uplink control data to transmit during the at least one uplink-downlink subframe; and
        discards the signal received in the downlink transmission based on signal quality of the received signal; and
    a memory coupled with the at least one processor of the UE.

11. A computer program product for half-duplex (HD) operations by a user equipment (UE) comprising a non-transitory computer readable medium having code stored thereon, the code executable by one or more processors for:
    determining, by the UE, an overlap in at least one uplink-downlink subframe in which an uplink subframe and a downlink subframe on different component carriers (CCs) used to communicate with the UE by a base station overlap; and
    following at least one prioritization rule of uplink-downlink subframe overlap, by the UE, to determine whether to transmit or receive during the at least one uplink-downlink subframe, wherein the at least one prioritization rule dictates that the UE:
      transmits during the at least one uplink-downlink subframe when the UE has at least one of uplink data or uplink control data to transmit in the at least one uplink-downlink subframe;
      is configured to receive a signal in a downlink transmission on at least one CC during the at least one uplink-downlink subframe when the UE has no uplink data or uplink control data to transmit during the at least one uplink-downlink subframe; and
    discards the signal received in the downlink transmission based on signal quality of the received signal.

* * * * *